No. 618,295. Patented Jan. 24, 1899.
R. SCHLEGEL.
PADDLE WHEEL.
(Application filed Dec. 29, 1897.)
(No Model.) 2 Sheets—Sheet 1.
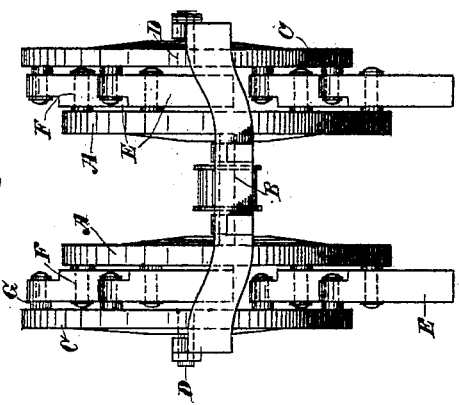
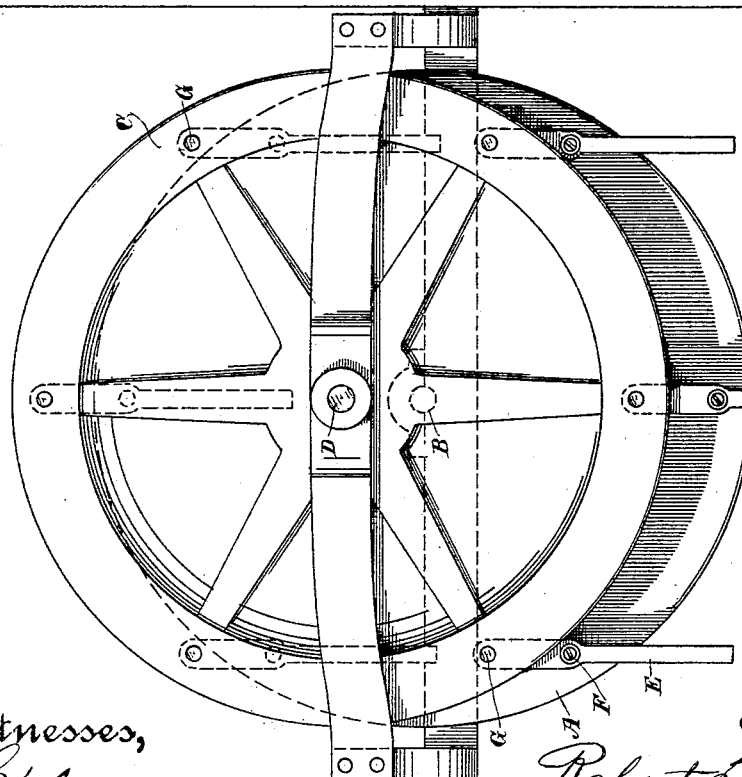
Witnesses,
Inventor,
Robert Schlegel
By Dewey & Co.
Attys No. 618,295. Patented Jan. 24, 1899.
R. SCHLEGEL.
PADDLE WHEEL.
(Application filed Dec. 29, 1897.)

(No Model.) 2 Sheets—Sheet 2.

Witnesses,
J. H. Towne
H. F. Ascheck

Inventor,
Robert Schlegel
By Dewey & Co.
Attys

UNITED STATES PATENT OFFICE.

ROBERT SCHLEGEL, OF SAN FRANCISCO, CALIFORNIA, ASSIGNOR OF ONE-HALF TO JOHN BAUMANN, OF SAME PLACE.

PADDLE-WHEEL.

SPECIFICATION forming part of Letters Patent No. 618,295, dated January 24, 1899.

Application filed December 29, 1897. Serial No. 664,210. (No model.)

*To all whom it may concern:*

Be it known that I, ROBERT SCHLEGEL, a citizen of the United States, residing in the city and county of San Francisco, State of California, have invented an Improvement in Feathering Paddle-Wheels; and I hereby declare the following to be a full, clear, and exact description of the same.

My invention relates to that class of wheels known as "feathering paddle-wheels" and in which the blades or floats of the wheel are made to dip into the water and pass through the arc of rotation while they are within the water and until they rise out of it without changing their essentially vertical position, whereby the beating upon the water when the blades enter and the lifting of a body of water when they leave, which is incident to the ordinary construction of fixed floats, is avoided.

My invention consists, essentially, in the novel arrangement of disks mounted upon main and supplemental shafts out of line with each other, journal-pins upon the peripheries of the disks, and floats or blades so connected with said journal-pins as to be maintained in essentially the same plane during the revolution of the wheel, said blades being also so constructed as to dip into the water through which the wheel is moving without the necessity of submerging the wheel-rims to such an extent as to create frictional resistance to the revolution.

Figure 3:
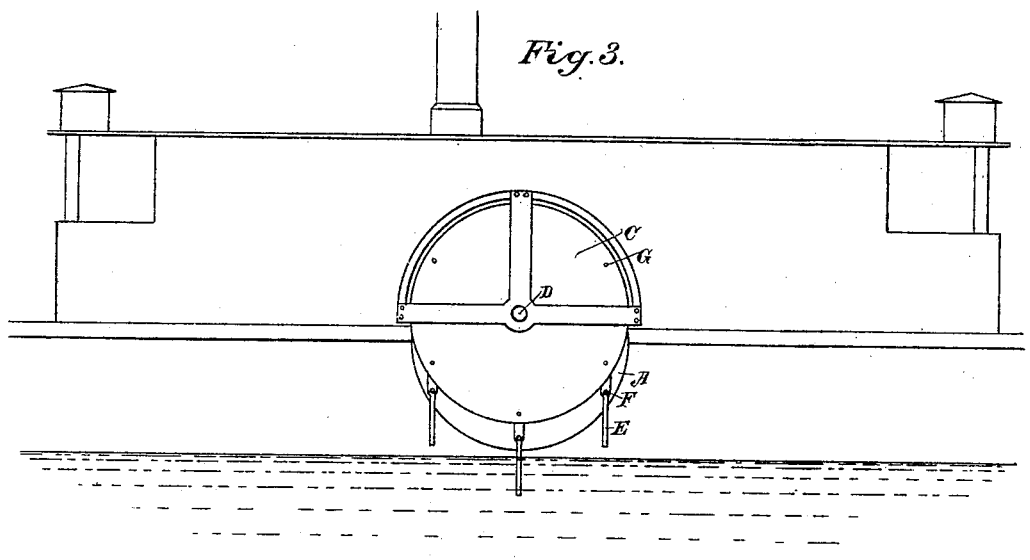
Figure 4:
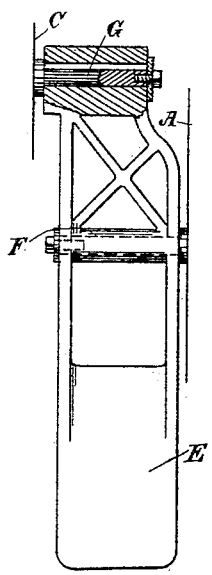
Figure 5:
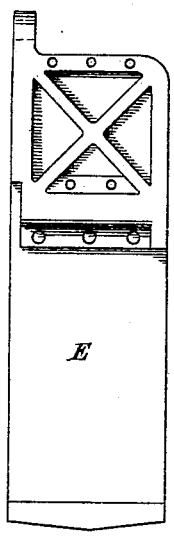
Figure 6:
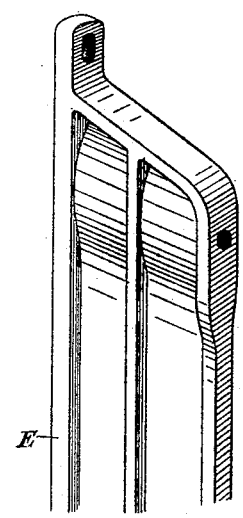

In the accompanying drawings, Figure 1 is a side elevation of a wheel of my construction, showing it applied to a stern-wheeler. Fig. 2 is an end view. Fig. 3 shows its application to a side-wheeler. Figs. 4, 5, and 6 are views showing different forms of floats or paddles.

A A are disks of any suitable diameter, depending upon the size of the wheel to be employed, and these disks are fixed to a shaft B, to which power is applied either directly from the engine or motor or by any intermediate mechanism, so that the shaft and its disks may be rotated. Exterior to the disks A are the disks C, which are mounted upon journal-pins or shafts D at a height above the shaft B equal to the distance by which it is desired to separate the supporting-journals of the paddle-blades. The greater the distance between these axes or shafts the greater the distance of the journal-supports of the blades from each other and the consequent strength of the supports, which enables me to make the blades of as great a length as may be desired.

The blades E are made of any suitable or desired form or material. In Figs. 4, 5, and 6 I have shown these blades made either entirely of metal with a truss-frame in the upper part and metal blade at the lower end or they may be made of a metal frame and wooden buckets suitably fixed to this frame and replaceable whenever broken. These blades are journaled upon the main disks A by means of stout shafts or journal-pins F, extending through boxes formed or fitted in the blades.

The upper ends of the floats or blades are fitted upon shafts or journal-pins G, which project inwardly from the disks C and in line essentially above the journal-pins or shafts of the disks A. These pins may be of a length sufficient to extend approximately across the full width of the blades, or the blades may be made narrower and beveling outwardly toward the disks C to form a narrower journal for the pins which project from these disks. The blades may be of any desired or convenient length below the journal-pins of the disks A, so that they project to a considerable distance below the lower periphery of these disks and can thus be made to dip into the water, so as to give any desired hold thereon, while the lower edges of the disks are either entirely clear of the water or only dip into it slightly or temporarily when the water is rough. By this means I am enabled to apply the greater portion of the power to forcing the blades through the water without any great loss which would be caused by the friction of the disks if submerged to any extent in the water.

The journals or bearings of the blades or floats may be made of any suitable or desirable material and are closed against the admission of dirt or grit from the water, which in rivers is often so muddy that the bearings will be soon worn out if constantly submerged.

In my device the bearings are much less exposed and are seldom and slightly immersed in the water and are therefore clear of this objection.

Having thus described my invention, what I claim as new, and desire to secure by Letters Patent, is—

1. In a paddle-wheel, the combination of disks mounted upon the ends of horizontally-journaled shafts, one of said shafts located above the line of the other and said shafts connecting with their respective disks from opposite sides to provide a clear space between them, pins fixed in the opposing faces of the disks, and extending in opposite directions across the said space, and blades each journaled upon two pins projecting from the disks, whereby the blades are maintained in a vertical position during the revolutions of the wheel.

2. In a paddle-wheel, the combination of opposing disks, horizontally-journaled shafts therefor and connecting with their respective disks from opposite sides, to provide a clear space between them, blades having journaled boxes extending through them, and pins on the disks to fit said boxes, said pins of each disk extending toward the companion disk and terminating short of the latter and one pin of each disk adapted to journal in one box of each blade.

3. In a paddle-wheel, the combination of opposing disks, horizontally-journaled shafts located one above the line of the other and connecting with their respective disks from opposite sides, to provide a clear space between them, and blades within said space and pivotally connected with opposing disks.

4. Paddle-wheel blades having a vertical length greater than their width and consisting of a truss-frame having horizontal journal-boxes extending through the upper and lower ends, with blades fixed to and extending downwardly from the frames, disks fixed upon horizontally-journaled shafts, out of line with each other and having an open space between them, and pins projecting from the rims of the opposing disks and entering the journal-boxes of the paddle-blades.

In witness whereof I have hereunto set my hand.

ROBERT SCHLEGEL.

Witnesses:
JESSIE C. BRODIE,
S. H. NOURSE.